(12) United States Patent
Kawamura et al.

(10) Patent No.: US 10,468,804 B2
(45) Date of Patent: Nov. 5, 2019

(54) CONNECTOR TERMINAL ASSEMBLY

(71) Applicant: Molex, LLC, Lisle, IL (US)

(72) Inventors: Takahiro Kawamura, Yamato (JP); Makoto Shinyama, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/008,447

(22) Filed: Jun. 14, 2018

(65) Prior Publication Data

US 2019/0006779 A1 Jan. 3, 2019

(30) Foreign Application Priority Data

Jun. 29, 2017 (JP) .................................. 2017-127263

(51) Int. Cl.
*H01R 13/15* (2006.01)
*H01R 13/24* (2006.01)
*H01R 12/70* (2011.01)

(52) U.S. Cl.
CPC ......... *H01R 13/15* (2013.01); *H01R 12/7088* (2013.01); *H01R 13/2421* (2013.01)

(58) Field of Classification Search
CPC ........ H01R 13/15; H01R 13/17; H01R 13/18; H01R 13/187; H01R 13/193; H01R 13/2414; H01R 13/2421; H01R 13/2428; H01R 12/7088
USPC ...................................................... 439/700
See application file for complete search history.

(56) References Cited

U.S. PATENT DOCUMENTS

| | | | | |
|---|---|---|---|---|
| 6,758,682 B1* | 7/2004 | Kosmala | ............ | H01R 13/2421 439/66 |
| 7,300,288 B1* | 11/2007 | Chen | .................. | H01R 13/2421 439/654 |
| 7,467,952 B2* | 12/2008 | Hsiao | ................. | H01R 13/2421 439/66 |
| 7,559,769 B2* | 7/2009 | Hsiao | ................... | H05K 7/1069 439/66 |
| 7,690,925 B2* | 4/2010 | Goodman | ............ | H05K 7/1061 361/813 |
| 7,717,756 B1* | 5/2010 | Yin | ..................... | H01R 13/2421 439/700 |
| 7,815,474 B1* | 10/2010 | Lin | ..................... | H01R 13/2421 439/482 |

(Continued)

FOREIGN PATENT DOCUMENTS

JP   2009-266470 A   11/2009
JP   2013-045665 A   3/2013

(Continued)

*Primary Examiner* — Harshad C Patel
(74) *Attorney, Agent, or Firm* — Molex, LLC

(57) ABSTRACT

A connector terminal assembly includes a retention part, a movable part, and an impelling part. The retention part includes a pair of side plate portions, a rear plate portion connecting the pair of side plate portions, and a retention and engaging part having an aperture on a bottom end side of the pair of side plate portions. The movable part includes a head portion and a main body unit. The main body unit has an engaging part on a bottom end side that engages with the aperture, the main body unit is electrically connected to the side plate portion, and the head portion is electrically connected to a mating electronic component. The impelling part impels the movable part.

12 Claims, 7 Drawing Sheets

(56) References Cited

U.S. PATENT DOCUMENTS

| | | | | |
|---|---|---|---|---|
| 7,914,348 B1* | 3/2011 | Lin | ........................ | H01R 12/57 |
| | | | | 439/700 |
| 8,337,256 B1* | 12/2012 | Lin | ............................... | 439/700 |
| 8,353,730 B1* | 1/2013 | Wang | ................. | H01R 13/2421 |
| | | | | 439/515 |
| 9,004,924 B2* | 4/2015 | Kuo | ................... | H01R 13/6205 |
| | | | | 439/188 |
| 2016/0134045 A1* | 5/2016 | Chen | ................... | H01R 12/716 |
| | | | | 439/700 |

FOREIGN PATENT DOCUMENTS

| | | |
|---|---|---|
| JP | 2013-149358 A | 8/2013 |
| TW | M453264 U | 5/2013 |
| WO | 2016/171324 A1 | 10/2016 |

* cited by examiner

FIG. 4A
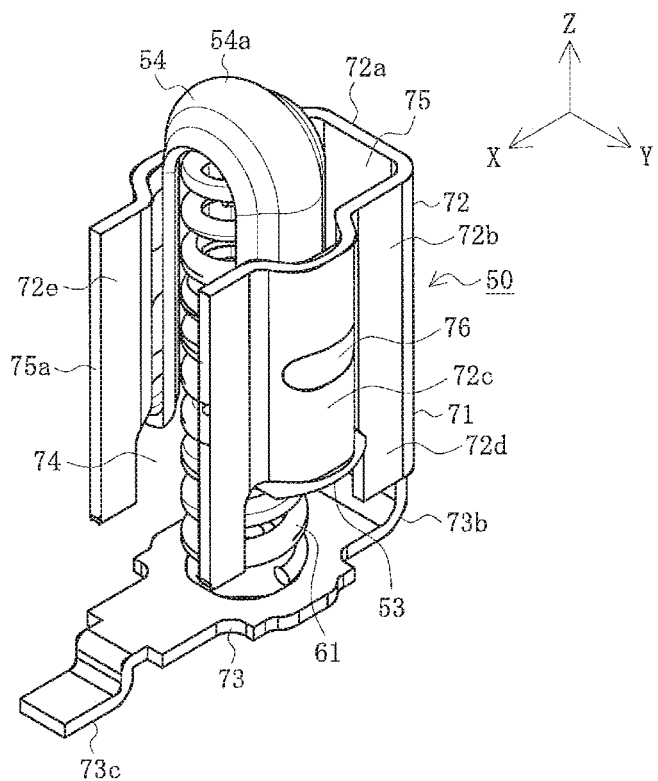
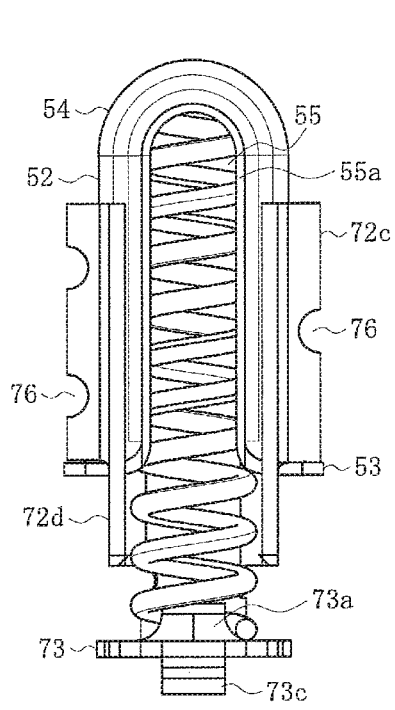
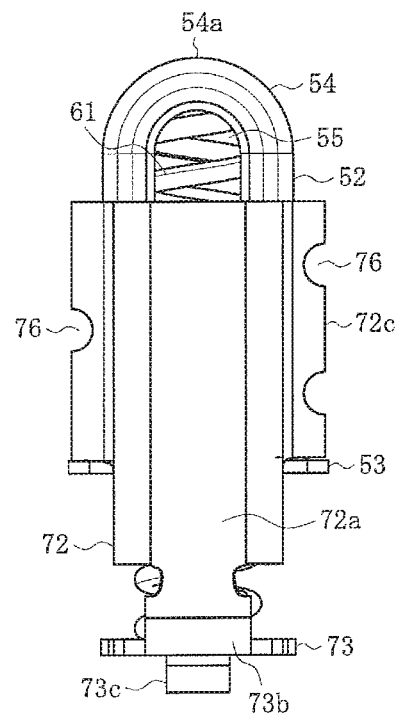
FIG. 4B   FIG. 4C

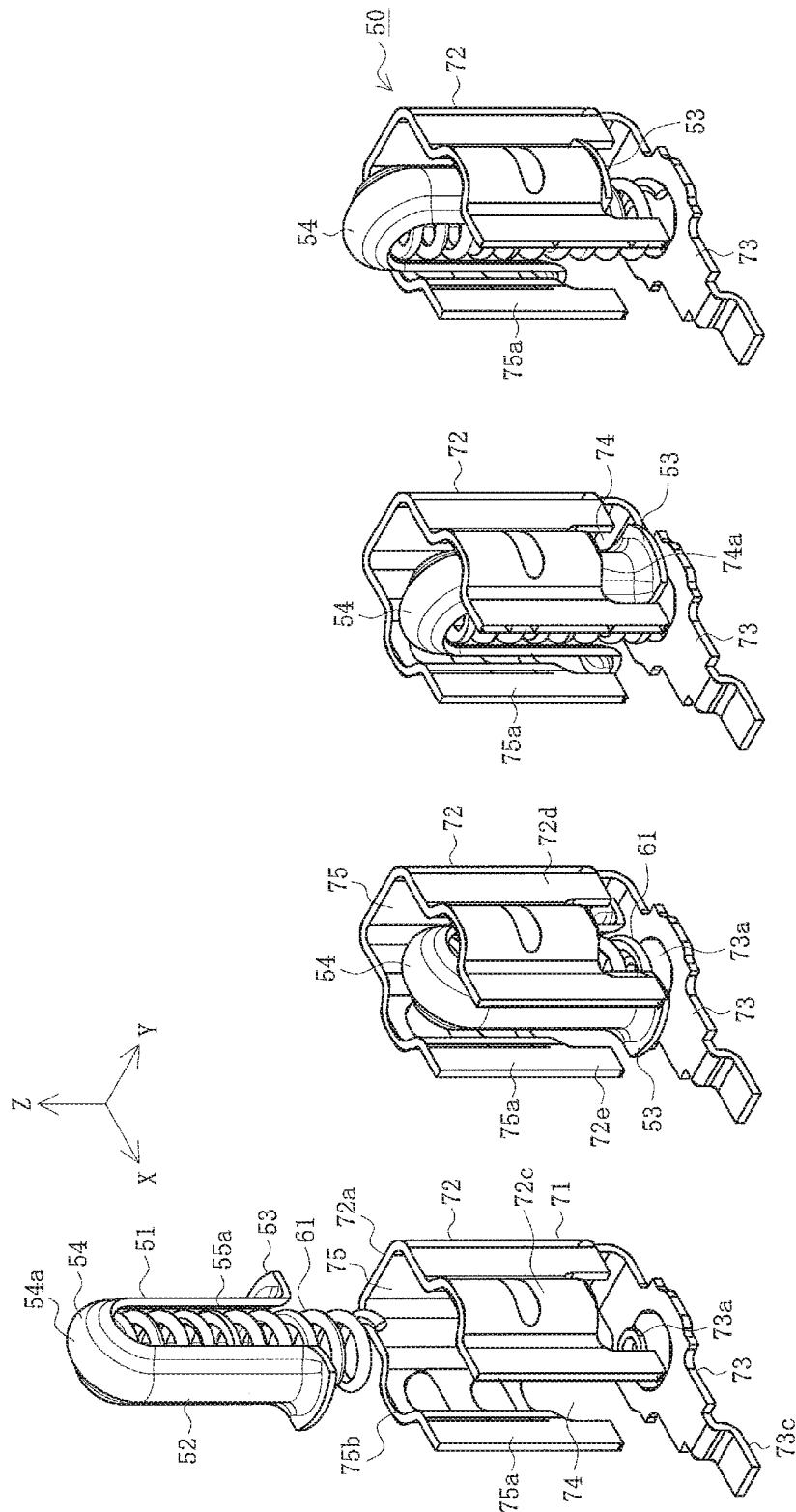

CONNECTOR TERMINAL ASSEMBLY

RELATED APPLICATIONS

This application claims priority to Japanese Application No. 2017-127263, filed Jun. 29, 2017, which is incorporated herein by reference in its entirety.

TECHNICAL FIELD

The present disclosure relates to a connector terminal assembly.

BACKGROUND ART

In the related art, in chargers and the like for charging batteries mounted on electronic equipment, an assembly having a movable contact maker impelled by a coil spring has been proposed as a terminal assembly used in a connector for contacting and electrically connecting the battery electrodes (for example, see Patent Document 1).

FIG. 7 is an exploded view of a known connector terminal assembly.

In FIG. 7, 851 is a movable contact maker that contacts a mating terminal that is not illustrated on the drawing, and 861 is a coil spring that impels the movable contact maker 851 in the upward direction, so that the movable contact maker 851 is pressed against the mating terminal. Also, 871 is a contact maker retention part that retains the movable contact maker 851, that is mounted on the surface of a circuit board that is not illustrated on the drawing, and that is electrically connected to a conductive trace.

The contact maker retention part 871 is a member produced by processing such as punching, bending, or the like, an electrically conductive metal sheet, and includes an internal wall part 872 having an approximately rectangular tubular shape, and a pair of external wall parts 877 provided on the left and right sides of the internal wall part 872. Note that an elastic contact member 876 is disposed between the internal wall part 872 and the external wall parts 877, and an engaging projection 874 is formed on the two external surfaces of the internal wall part 872 that are not opposite to the external wall parts 877.

The movable contact maker 851 is a member having an approximately rectangular tubular shape produced by processing such as punching and bending a conductive metal sheet, and includes a contact sheet part 854 having a rectangular flat shape, and four side sheet parts 852 connected to the four sides of the contact sheet part 854. Note that a contact portion 854a that protrudes upwards is formed in the center of the contact sheet part 854, and apertures 853 for sliding are formed in one set of the side sheet parts 852.

Then, with the coil spring 861 interposed between the contact maker retention parts 871, the movable contact maker 851 is installed in the contact maker retention part 871 so as to cover the internal wall part 872. With the movable contact maker 851 installed on the contact maker retention part 871, the two side sheet parts 852 on which the apertures 853 for sliding are not formed are inserted between the internal wall part 872 and the external wall parts 877 and contact the elastic contact member 876, and the engaging projections 874 are inserted into and engage with the apertures 853 for sliding.

In this way, the apertures 853 for sliding are engaged with the engaging projections 874, so even though the movable contact maker 851 is impelled upwards by the coil spring 861, it is not removed from the contact maker retention part 871. Also, the side sheet parts 852 contact the elastic contact member 876, so even though the movable contact maker 851 is displaced upwards and downwards, the state of conductivity with the contact maker retention part 871 can be reliably maintained.

Patent Document 1: JP 2013-045665

SUMMARY

However, in this known connector terminal assembly, the contact maker retention part 871 is formed so that it includes the approximately square tubular internal wall part 872, and the pair of external wall parts 877 located on both sides to the left and right of the internal wall part 872, as a result the structure is complex, assembly is difficult, and the manufacturing cost is high. Also, the side sheet parts 852 on which the apertures 853 for sliding are formed are located only at the outer surfaces of the internal wall part 872 on which the engaging projections 874 are formed. Therefore, when subjected to an external force such as shock or vibration, the engagement between the engaging projection 874 and the apertures 853 for sliding can be easily released, so the movable contact maker 851 is removed from the contact maker retention part 871, and there is a strong possibility that the connector terminal assembly will be dismantled.

Here, an object is to provide a highly reliable connector terminal assembly that solves the problem points regarding the conventional connector terminal assembly, that has a simple configuration, for which assembly is simple, has a low cost, in which the retention part can reliably retain the movable part, and the conductive state between the retention part and the movable part can be reliably maintained.

For this purpose, the connector terminal assembly includes: a retention part, a movable part, and an impelling part. The retention part includes a pair of opposing side plate portions, a rear plate portion connecting the pair of side plate portions, and a retention and engaging part having an aperture on a bottom end side of the pair of side plate portions. The movable part includes a head portion and a main body unit. The main body unit has an engaging part on a bottom end side that engages with the aperture, the main body unit is electrically connected to the side plate portion, and the head portion is electrically connected to a mating electronic component. The impelling part impels the movable part.

In another connector terminal assembly, the retention and engaging part of the retention part and the engaging part of the movable part contact in the state of being impelled by the impelling part.

In yet another connector terminal assembly, the main body unit includes a pair of legs connected by the head portion, the impelling part is disposed between the pair of legs, and the impelling part impels the movable part by contacting the head portion.

In yet another connector terminal assembly, the head portion has a shape that is curved with respect to the mating electronic component, and the legs have a shape that is curved with respect to the side plate portions.

In yet another connector terminal assembly, the side plate portions have a shape that is curved towards the outside, and in the pair of side plate portions, the distance between the pair of edges on the opposite side to the rear plate portion is smaller than the distance between the pair of legs.

In yet another connector terminal assembly, the ends of the legs are curved in a direction normal to the impelling direction so that the width of the side openings of the movable part is smaller than the external diameter of the impelling part.

The connector includes the connector terminal assembly.

According to the present disclosure, it is possible to provide a connector terminal assembly with improved reliability, that has a simple configuration, for which assembly is simple, that has a low cost, in which the retention part can reliably retain the movable part, and the conductive state between the retention part and the movable part can be reliably maintained.

BRIEF DESCRIPTION OF THE DRAWINGS

FIGS. 4A to 4C illustrate three views of the terminal assembly in accordance with the present embodiment, FIG. 4A is a perspective view, FIG. 4B is a front view, and FIG. 4C is a rear view.

FIG. 5A is a top view, FIG. 5B is a cross-section at A-A in FIG. 5A, and FIG. 5C is a cross-section at B-B in FIG. 5A.

FIGS. 6A to 6D illustrate a method of assembly of the terminal assembly in accordance with the present embodiment, FIGS. 6A to 6D illustrate the processes of assembly.

DETAILED DESCRIPTION OF THE PREFERRED EMBODIMENTS

Embodiments will be described in detail below with reference to the drawings.

Figure 1:
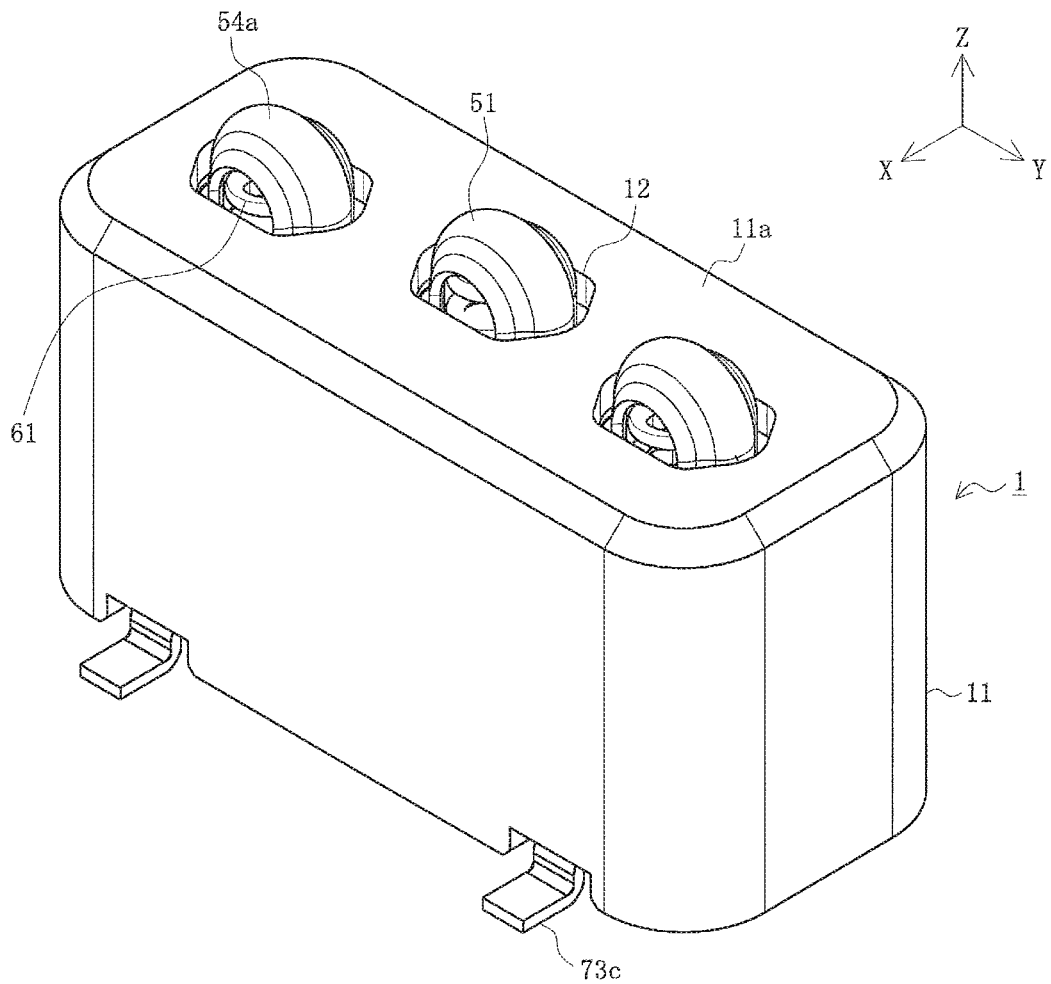
FIG. 1 is a perspective view of a connector in accordance with the present embodiment.
Figure 2:
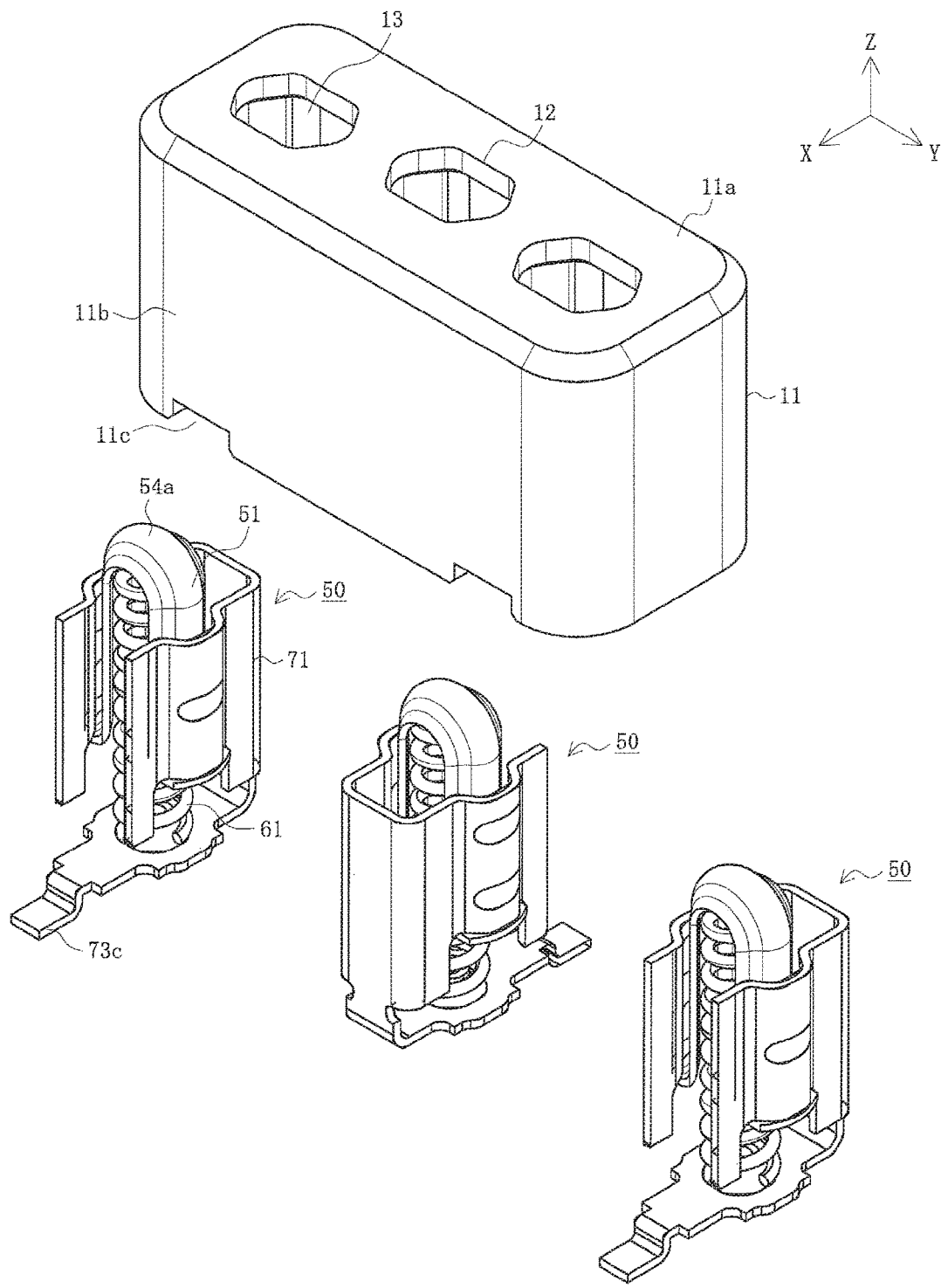
FIG. 2 is an exploded view of the connector in accordance with the present embodiment.

FIG. 1 is a perspective view of a connector in accordance with the present embodiment, and FIG. 2 is an exploded view of the connector in accordance with the present embodiment.

In the drawings, 1 is a connector that includes a terminal assembly 50 as connector terminal assembly in accordance with the present embodiment, installed on an electronic apparatus that is not illustrated on the drawings. A mating apparatus that is not illustrated on the drawings is mounted on the electronic apparatus, and the mating apparatus is electrically connected to a circuit, which is not illustrated on the drawings, of the electronic apparatus via the connector 1. Note that the electronic apparatus may be any type of apparatus such as a personal computer, mobile telephone, smartphone, tablet terminal, digital camera, video camera, music player, game machine, navigation device, battery charger.

Also, the mating apparatus may be any type of equipment provided it is an apparatus mounted on the electronic equipment, for example it may be an electrical connector, but in this description, it is a battery. In this case, the electronic apparatus on which the connector 1 is installed is a smartphone or a battery charger for the smartphone.

Here, as illustrated in the drawings, the connector 1 includes a housing 11 in box form formed integrally from an insulating material such as synthetic resin or the like; and a terminal assembly 50 housed in a housing recess 13 of the housing 11 and having a contact portion 54a that projects from an opening 12 formed in a top plate 11a of the housing. The terminal assembly 50 is a member that includes a retention part 71, a movable part 51 that is retained by the retention part 71 so that it can be displaced in the vertical direction (Z-axis direction), and an impelling part 61 that impels the movable part 51 in the upward direction (positive Z-axis direction) relative to the retention part 71. Note that preferably the impelling part 61 is a coil spring. The contact portion 54a is a part of the movable part 51 and is the part that contacts a mating terminal that is not illustrated on the drawings and that is provided on the mating apparatus. Also, a tail part 73c of the terminal assembly 50 projects from a notch 11c formed on a bottom end of a side wall 11b of the housing 11. The tail part 73c is a portion of the retention part 71, and is the portion that is connected by means such as soldering to a conductive trace such as an electrical power line that is not illustrated in the drawings and that is provided on the electronic apparatus.

Note that in the example illustrated in the drawings, the number of the terminal assemblies 50 housed in the housing 11 is three, and the contact portions 54a are arranged in a single row in the width direction (Y-axis direction) of the housing 11. Also, the tail parts 73c are disposed with alternate orientations in the X-axis direction. However, the number of the terminal assemblies 50 may be two or fewer or may be four or more, and the form of the arrangement may be modified as appropriate.

In this way, the movable part 51 is retained so that it can be displaced in the vertical direction, and, is impelled in the upward direction by the impelling part 61, so the contact portions 54a projecting from the openings 12 formed in the top plate 11a of the housing 11 can also be displaced in the vertical direction, and, are impelled in the upward direction. Therefore, even in a case where the position of the mating terminal of the mating apparatus located above the connector 1 is displaced in the vertical direction, the contact portion 54a can be displaced to track that displacement, so the state of contact with the mating terminal can be reliably maintained.

Note that expressions for indicating directions such as up, down, left, right, front, and back, used to describe the operations and configurations of the parts of the connector 1 and the terminal assembly 50 in the present embodiment are not absolute but rather relative directions, and though appropriate when the parts of the connector 1 and the terminal assembly 50 are in the positions illustrated in the drawings, these directions should be interpreted differently when the positions of each part of the connector 1 and the terminal assembly 50 change, in order to correspond to said change.

Next, the configuration of the terminal assembly 50 is described in detail.

Figure 3:
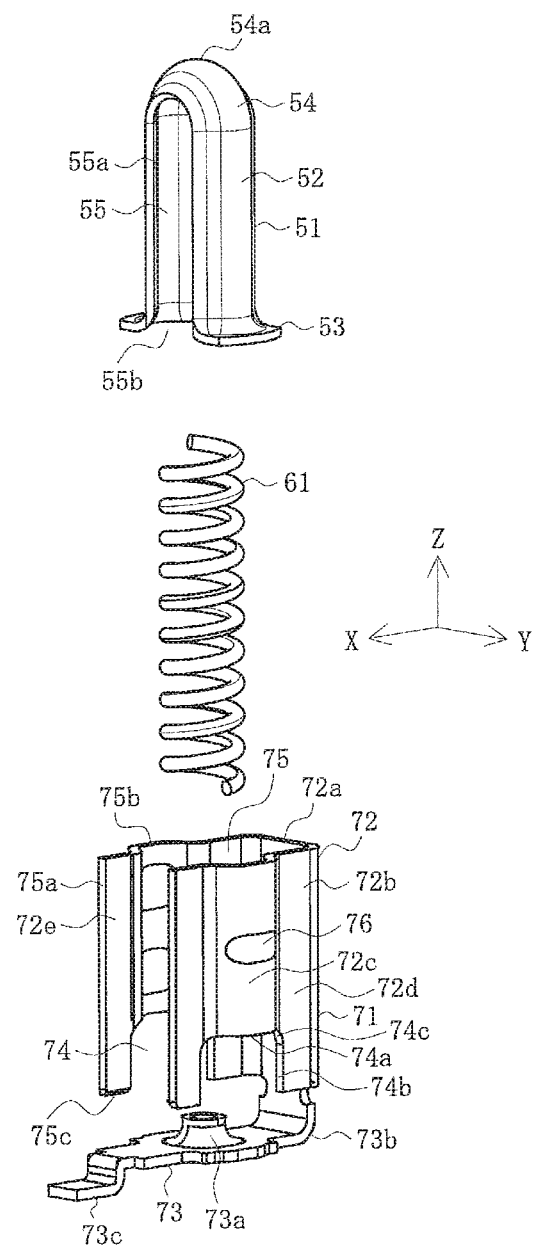
FIG. 3 is an exploded view of the terminal assembly in accordance with the present embodiment.
Figure 5A:
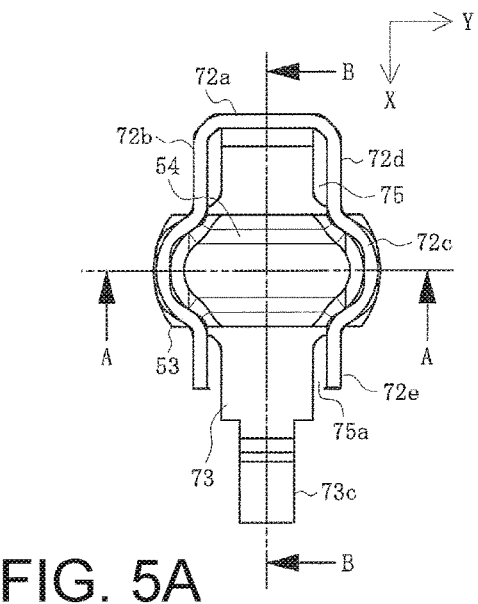
FIGS. 5A to 5C are explanatory views illustrating the cross-sectional structure of the terminal assembly in accordance with the present embodiment.
Figure 5C:
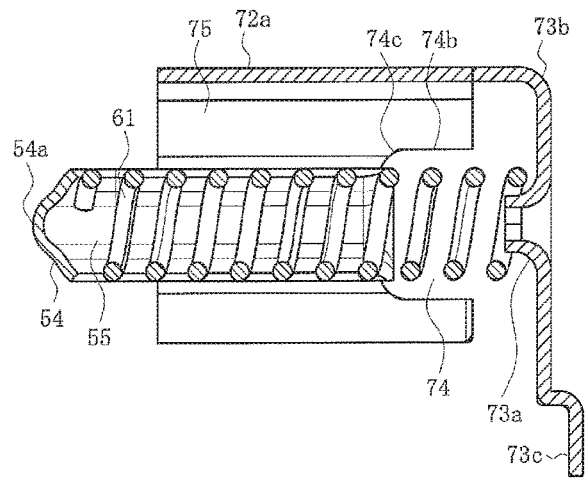
Figure 5B:
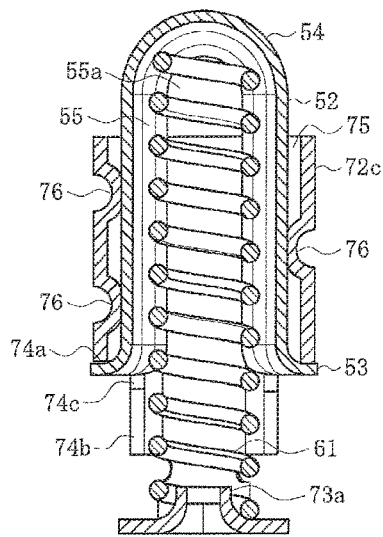
Figure 7:
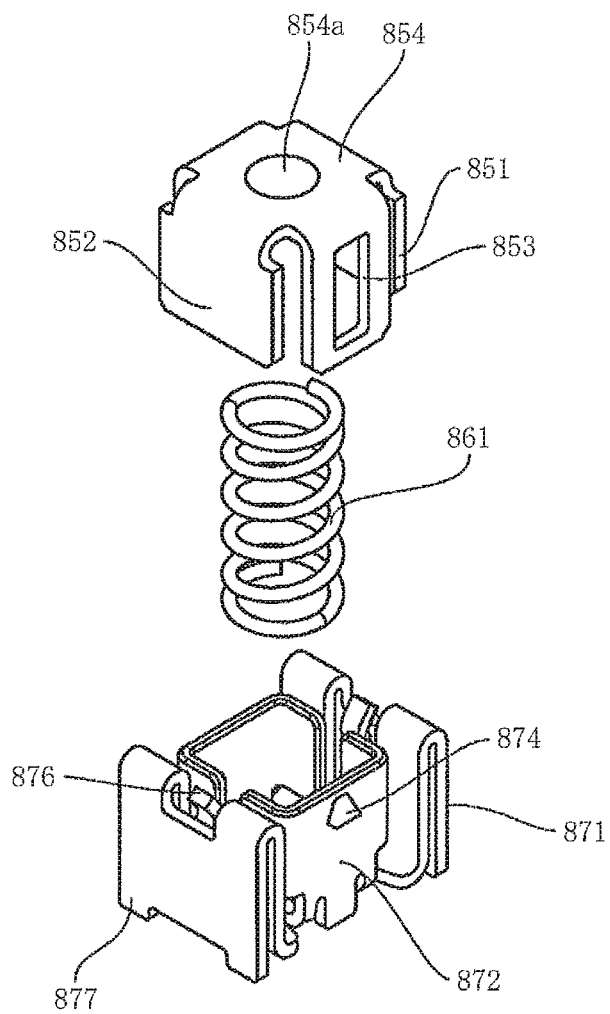
FIG. 7 is an exploded view of a conventional connector terminal assembly.

FIG. 3 is an exploded view of the terminal assembly in accordance with the present embodiment, FIGS. 4A to 4C illustrate three views of the terminal assembly in accordance with the present embodiment, and FIGS. 5A to 5C is an explanatory view illustrating the cross-sectional structure of the terminal assembly in accordance with the present embodiment. Note that in FIGS. 4A to 4C, FIG. 4A is a perspective view, FIG. 4B is a front view, and FIG. 4C is a rear view. In FIGS. 5A to 5C, FIG. 5A is a top view, FIG. 5B is a cross-sectional view at A-A in FIG. 5A, and FIG. 5C is a cross-sectional view at B-B in FIG. 5A.

The movable part 51 is a member that is formed by processes such as punching, pressing, and bending on single sheet of conductive metal. The movable part 51 includes a pair of legs 52 that extends in the vertical direction (Z-axis direction) with the legs facing each other, a head portion 54 having a shape that is curved through 180° viewed from the X-axis direction and that is connected to the top ends of the legs 52, and a flange portion 53 that projects towards the outside in the Y-axis direction from the bottom ends of the legs 52 as engaging parts. In the present embodiment, the X-axis, the Y-axis, and the Z-axis as a rule indicate front-rear, left-right, and up-down directions, but they are not necessarily limited to this, and when the attitude of each part of the connector 1 and the terminal assembly 50 is changed, the interpretation should also be changed in accordance with the change in attitude. Also, the positive direction of each axis is the direction indicated by the arrow on the drawings, and the negative direction is the opposite direction, but they are not necessarily limited to this, and when the attitude of each part of the connector 1 and the terminal assembly 50 is changed, the interpretation should also be changed in accordance with the change in attitude. In addition, when neither positive nor negative is indicated, it means that it may be either direction.

Note that the legs 52, the flange portion 53, and the head portion 54 are an integrally connected part, and the movable part 51 has the overall shape of a long member that is curved into a U-shape with a C-shaped cross-section. In other words, the legs 52 are a portion that is a long and narrow curved cross-section sheet member with a shape like a rainwater gutter, that extends in the vertical direction; the head portion 54 is a portion that is a long and narrow curved cross-section sheet member that is curved through 180° along the longitudinal direction; and the flange portion 53 is a portion in which the long and narrow curved cross-section sheet member is bent to the outside in the Y-axis direction and in addition is flat.

In this way, the legs 52 have a lateral cross-section with a curved shape in both the Y-axis direction and the Z-axis direction, so the second moment of area of the cross-section is large, its strength is large, and it is not easily deformed. Also, the head portion 54 has a three-dimensional curved surface, so its strength is high and it is not easily deformed. Therefore, even when the movable part 51 is impelled by the impelling part 61 in the upward direction (Z-axis positive direction) and the head portion 54 presses against the mating terminal, there is no deformation in the Y-axis direction and the Z-axis direction.

Also, the contact portion 54a is the top portion of the head portion 54, and corresponds to the upwardly protruding or three-dimensional curved surface top portion. Therefore, when the mating terminal is a planar shaped member that extends in the X-axis-Y-axis direction, the contact portion 54a is the point of contact with the mating terminal.

Also, an impelling part housing space 55 is formed on the inside of the movable part 51 as a space whose periphery is defined by the legs 52 and the head portion 54. The impelling part housing space 55 is a space that houses the impelling part 61 that is the coil spring, that connects with the exterior via side openings 55a located in the front and rear directions (X-axis direction) in FIG. 3, and, a bottom opening 55b located in the downward direction (Z-axis negative direction). Also, preferably the width of the side openings 55a (dimension in the Y-axis direction) is smaller than the external diameter of the impelling part 61, and the diameter of the bottom opening 55b is larger than the external diameter of the impelling part 61. In this way, the impelling part 61 can be inserted into or removed from the impelling part housing space 55 via the bottom opening 55b, but the impelling part 61 cannot be inserted into or removed from the impelling part housing space 55 via the side openings 55a.

The retention part 71 is a member that is formed from a single conductive metal sheet that is processed by punching, pressing, bending, and the like. The retention part 71 includes a main body unit 72 that extends in the vertical direction (Z-axis direction), and a bottom plate 73 connected to the bottom end of the main body unit 72 as an impelling part retention unit. Note that the main body unit 72 and the bottom plate 73 are an integrally connected member.

Also, the main body unit 72 includes a rear plate portion 72a that extends in the vertical direction and has a long and narrow flat plate shape, and a pair of side plate portions 72b that extends from the left and right sides edges of the rear plate portion 72a towards the front (X-axis positive direction). The overall shape of the main body unit 72 viewed from above is an approximate C-shape formed by the rear plate portion 72a and the pair of side plate portions 72b.

Also, a movable part housing space 75 is formed on the inside of the main body unit 72 as a space whose periphery is defined by the rear plate portion 72a and the side plate portions 72b. The movable part housing space 75 is a space that houses the movable part 51, that connects with the exterior via a front opening 75a located in the front direction (X-axis positive direction) in FIG. 3, a top opening 75b located in the upward direction (Z-axis positive direction) and, a bottom opening 75c located in the downward direction (Z-axis negative direction). Also, preferably the width of the front opening 75a (dimension in the Y-axis direction) is smaller than the width of the movable part 51, and is larger than the thickness (X-axis direction dimension) of the movable part 51. In this way, the impelled movable part 51 in the attitude as illustrated in FIG. 3 is not allowed to move parallel to the X-axis direction, and cannot be inserted into or removed from the movable part housing space 75 via the front opening 75a. Only after the movable part 51 in the attitude as illustrated in FIG. 3 has been rotated through 90° with its central axis that extends in the Z-axis direction as center, can it be moved parallel to the X-axis direction, and be inserted into or removed from the movable part housing space 75 via the front opening 75a. Also, after the movable part 51 in the attitude as illustrated in FIG. 3 has been rotated through 90° with its central axis that extends in the Z-axis direction as center, the movable part 51 can be moved parallel to the Z-axis direction, and can be inserted into or removed from the movable part housing space 75 via the top opening 75b. However, the movable part 51 cannot be inserted into or removed from the movable part housing space 75 via the bottom opening 75c because of the presence of the bottom plate 73.

Note that each of the side plate portions 72b includes a rear portion 72d and a front portion 72e that extend in the vertical direction and have a long and narrow flat plate shape, and a curved portion 72c with a curved cross-sectional shape that extends in the vertical direction with the shape of a rainwater gutter, and that is connected to the rear portion 72d and the front portion 72e.

The rear portion 72d is connected to the rear plate portions 72a, and the front portions 72e extend to the front. Also, as illustrated in FIG. 5A, in the side plate portions 72b that are facing each other, the rear portions 72d are parallel to each other, and the front portions 72e are parallel to each other. In addition, in each of the side plate portions 72b, the rear portion 72d and the front portion 72e are substantially coplanar. Also, the distance between opposite rear portions 72*d* and the distance between opposite front portions 72*e* correspond to the width of the front opening 75*a*.

As illustrated in FIG. 5A, the curved portion 72*c* is curved in a transverse cross-section normal to the Z-axis, and protrudes to the outside in the Y-axis direction. Therefore, the distance between opposing curved portions 72*c* is greater than the width of the front opening 75*a*, and is a distance that enables the movable part 51 in the attitude illustrated in FIG. 3 to be accommodated. Also, the curvature of the curved portion 72*c* in a transverse cross-section normal to the Z-axis is preferably about the same as the curvature of the legs 52 of the movable part 51 in a transverse cross-section normal to the Z-axis. In the movable part housing space 75, the movable part 51 is accommodated in the space between the opposing curved portions 72*c*, and at least a portion of the outer side surface of the legs 52 is opposite the inner side surface of the curved curved portion 72*c*.

Also, a notch 74 is formed on the bottom of the curved portion 72*c* in each of the side plate portions 72*b* as a retention and engaging part that engages with and stops the flange portion 53 of the movable part 51. Therefore, the position of the top edge in the Z-axis direction of the curved portion 72*c* is the same as the position of the top edge in the Z-axis direction of the rear portion 72*d* and the front portion 72*e*, but the position of the bottom edge in the Z-axis direction of the curved portion 72*c* is higher than the position of the bottom edge in the Z-axis direction of the rear portion 72*d* and the front portion 72*e*. Also, a top edge 74*a* that is the edge located on the top side of the notch 74 corresponds to the bottom edge of the curved portion 72*c*, and side edges 74*b* on the front and rear of the notch 74 correspond to the front edge of the rear portion 72*d* and the rear edge of the front portion 72*e*. Also, preferably a chamfered portion 74*c* with a curved or sloping surface is formed at the portion where the front and rear ends of the top edge 74*a* of the notch 74 transition to the front and rear side edges 74*b*.

Also, in the state in which the movable part 51 is housed in the movable part housing space 75 and retained by the retention part 71, the flange portion 53 of the movable part 51 enters the notch 74 and is engaged. In this state, the movable part 51 is impelled in the upward direction by the impelling part 61, so as illustrated in FIGS. 4A to 4C and FIGS. 5A to 5C, the top surface of the flange portion 53 contacts the top edge 74*a* of the notch 74. In this way, the movable part 51 is prevented from being displaced upwards, and the positional relationship in the vertical direction of the movable part 51 is restricted relative to the retention part 71, and the amount of protrusion of the contact portion 54*a* of the head portion 54 from the top edge of the retention part 71 is limited. Also, the impelling force of the impelling part 61 acts on the whole top edge 74*a* which is broad in width, so the side plate portions 72*b* are not damaged.

Furthermore, the front edge and rear edge of the flange portion 53 are adjacent to and opposite the front and rear side edges 74*b* of the notch 74. In this way, rotation of the movable part 51 about the central axis that extends in the Z-axis direction as center is limited to a small angular range. Note that when the chamfered portion 74*c* is formed at the portion where the front and rear ends of the top edge 74*a* of the notch 74 transition to the front and rear side edges 74*b*, stress concentration will not occur even in a case where the flange portion 53 contacts the top edge 74*a* and the side edges 74*b*, so the side plate portions 72*b* will not be damaged.

Furthermore, a contact protrusion 76 that protrudes towards the inside in the Y-axis direction is formed on the curved portion 72*c* of each of the side plate portions 72*b*. The number and positions at which the contact protrusions 76 are formed can be any number and positions, and can be determined as appropriate. However, for the sake of explanation, in the example illustrated in the drawings viewed from the front, on the curved portion 72*c* on the right side, one contact protrusion 76 is formed near the center in the vertical direction, and on the curved portion 72*c* on the left side, one contact protrusion 76 is formed close to the top edge and one is formed close to the bottom edge. In this case, as illustrated in FIG. 5B, the number of the contact protrusions 76 that contacts the legs 52 of the movable part 51 differs left and right, so the orientation of the movable part 51 can be stabilized. Also, the contact protrusions 76 contact the legs 52 of the movable part 51 at three locations, so at all contact locations, the contact between the contact protrusions 76 and the legs 52 is reliably maintained, and the state of conductivity between the retention part 71 and the movable part 51 is reliably maintained.

The bottom plate 73 is a substantially flat sheet-like member that extends in the X-axis-Y-axis directions, and is disposed below and separated from the side plate portions 72*b*, specifically below and separated from the bottom edges of the rear portions 72*d* and the front portions 72*e*. Also, the bottom plate 73 includes an impelling part positioning part 73*a* formed close to the center having substantially the shape of a frustum of a circular cone and protruding upwards, a connecting part 73*b* that is a curved portion formed at the rear edge that connects with the bottom edge of the rear plate portion 72*a* of the main body unit 72, and a tail part 73*c* connected to the front edge via a step portion. Note that the tail part 73*c* is not necessarily connected to the front edge of the bottom plate 73, but may be connected to the connecting part 73*b*, or may be connected midway to the bottom plate 73. Also, the impelling part positioning part 73*a* is a member that is inserted into the internal space of the impelling part 61 that is the coil spring from the bottom end thereof, and is located directly below the space between the opposing curved portions 72*c*. As illustrated in FIGS. 4A to 4C and FIGS. 5A to 5C, the bottom end of the impelling part 61 that is housed within the impelling part housing space 55 of the movable part 51 that is housed within the movable part housing space 75 engages with and is positioned by the impelling part positioning part 73*a*. Also, the impelling force of the impelling part 61 is applied to the bottom plate 73.

Next, a method of assembling the terminal assembly 50 is described.

FIGS. 6A to 6D illustrate a method of assembly of the terminal assembly in accordance with the present embodiment. Note that FIGS. 6A to 6D illustrate each of the processes of assembly.

First, the operator manually positions the movable part 51 housing the impelling part 61 within the impelling part housing space 55 above the retention part 71 as illustrated in FIG. 6A. At this time, the attitude of the movable part 51 is controlled so that the central axis thereof extends in the Z-axis direction, the contact portion 54*a* is oriented upwards (Z-axis positive direction), the side openings 55*a* of the impelling part housing space 55 are oriented in the Y-axis direction, and the flange portions 53 face outwards in the X-axis direction. This attitude corresponds to the attitude of the movable part 51 that is oriented as illustrated in FIG. 3 after it has been rotated through 90° about the central axis thereof extending in the Z-axis direction as center. Note that the attitude of the retention part 71 is the same as that illustrated in FIGS. 3 and 4. Then, the operator lowers the movable part 51 downwards (Z-axis negative direction)

relative to the retention part 71, and inserts the movable part 51 into the movable part housing space 75 via the top opening 75b. At this time, the position of the central axis of the movable part 51 (corresponds to the central axis of the impelling part 61 that is the coil spring) is controlled in the X-axis-Y-axis directions relative to the retention part 71 of the movable part 51 so that it passes through the center of the impelling part positioning part 73a of the bottom plate 73.

Then, as illustrated in FIG. 6B, the movable part 51 is housed in the movable part housing space 75 of the retention part 71, and the bottom end of the impelling part 61 engages with and is positioned by the impelling part positioning part 73a. At this time, the operator manually applies a force to press the movable part 51 towards the bottom plate 73 against the impelling force of the impelling part 61, so that the position in the Z-axis direction of the flange portion 53 is lower than the position in the Z-axis direction of the bottom edge of the rear portion 72d and the front portion 72e.

Next, the operator rotates the movable part 51 through 90° about its central axis that extends in the Z-axis direction as center, so that the flange portion 53 faces outwards in the Y-axis direction as illustrated in FIG. 6C. At this time, the position in the Z-axis direction of the flange portion 53 is lower than the position in the Z-axis direction of the bottom edge of the rear portion 72d and the front portion 72e, so the two flange portions 53 can be rotated about the central axis thereof as center and pass between the bottom edge of the rear portion 72d and the bottom plate 73 and between the bottom edge of the front portion 72e and the bottom plate 73. Then, as illustrated in FIG. 6C, when the attitude of the flange portions 53 positions them directly below the notches 74, the operator releases the force pressing the movable part 51 towards the bottom plate 73.

Then, the movable part 51 is displaced upwards by the impelling force of the impelling part 61, and as illustrated in FIG. 6D, the top surface of the flange portion 53 contacts the top edge 74a of the notch 74. In this way, the movable part 51 is prevented from being displaced upwards, the position in the Z-axis direction of the movable part 51 is restricted relative to the retention part 71, the amount of protrusion of the contact portion 54a of the head portion 54 from the top edge of the retention part 71 is limited, and the terminal assembly 50 can be obtained as illustrated in FIGS. 4A to 5C.

Here, an example has been described in which the movable part 51 is moved in the Z-axis negative direction relative to the retention part 71, and inserted into the movable part housing space 75 via the top opening 75b. However, the movable part 51 with its attitude controlled so that the flange portion 53 is facing towards the outside in the X-axis direction can also be inserted into the movable part housing space 75 via the front opening 75a by moving it in the X-axis negative direction relative to the retention part 71. Note that when the movable part 51 is inserted into the movable part housing space 75 via the front opening 75a, it is necessary for the operator to raise the bottom end of the impelling part 61, so that it does not get caught in the impelling part positioning part 73a. The subsequent operations are the same as the operations illustrated in FIGS. 6B to 6D.

In this way, in the present embodiment, the terminal assembly 50 includes the retention part 71, the movable part 51, and the impelling part 61. Also, the retention part 71 includes the pair of opposing side plate portions 72b, the rear plate portion 72a connecting the pair of side plate portions 72b, and the notches 74 having an opening on the bottom end side of the pair of side plate portions 72b. The movable part 51 includes the head portion 54 and the main body unit, and the main body unit includes an engaging part that engages with the openings on the bottom end side. The main body unit is electrically connected to the side plate portions 72b. The head portion 54 is electrically connected to a mating electronic component, and the impelling part 61 impels the movable part 51.

The main body part of the movable part 51 may be a member connected to the head portion 54 that extends in the impelling direction, and may also not include for example the side openings 55a, as well as the pair of legs 52 as described in the present embodiment.

Also, the impelling part 61 may make contact at a part other than the head portion 54 provided the movable part 51 is impelled, for example a part other than the head portion 54 may be subjected to the impelling force to impel the movable part 51.

Also, for ease of assembly, the shape of the notch 74 is preferably open at the bottom end in the Z-axis negative direction as illustrated in FIG. 3. However, provided there is an opening, it need not open on the bottom end in the Z-axis negative direction, and it may be a rectangular shaped opening.

In this way, the terminal assembly 50 has a simple configuration, its assembly is easy, its cost is low, and by forming the side plate portions 72b as the electrical contact points and the notch 74, the effect of positional deviation due to rotation of the electrical contact points can be minimized, and the reliability improved.

Also, the notch 74 of the retention part 71 and the engaging part of the movable part 51 are in contact when impelled by the impelling part 61. In addition, the main body unit includes the pair of legs 52 connected by the head portion 54, and the impelling part 61 is located between the pair of legs 52, so the impelling part 61 contacts the head portion 54 and impels the movable part 51. In addition, the head portion 54 has a shape that is curved with respect to the mating electronic component, and the legs 52 have a shape that are curved with respect to the side plate portions 72b. Therefore, the strength of each part of the movable part 51 is high, and they do not deform even when subjected to external force.

In addition, the side plate portions 72b have a shape that is curved towards the outside, and in the pair of side plate portions 72b, the distance between the pair of edges on the opposite side to the rear plate portion 72a is smaller than the distance between the pair of legs 52. Therefore, the pair of legs 52 can be accommodated and retained in the space between the pair of side plate portions 72b.

In addition, the ends of the legs 52 are curved in a direction normal to the impelling direction so that the width of the side openings 55a of the movable part 51 is smaller than the external diameter of the impelling part 61. Therefore, the impelling part 61 can be housed within the interior of the movable part 51.

In addition, the connector 1 includes the terminal assembly 50.

Note that the disclosure of the present specification describes characteristics related to preferred and exemplary embodiments. Various other embodiments, modifications and variations within the scope and spirit of the claims appended hereto could naturally be conceived by persons skilled in the art by summarizing the disclosures of the present specification.

The present disclosure can be applied to connector terminal assemblies.

The invention claimed is:

1. A connector terminal assembly comprising:
   a retention part;
   a movable part; and
   an impelling part,
   the retention part including a pair of opposing side plate portions, a rear plate portion connecting the pair of side plate portions, and a retention and engaging part having an aperture on a bottom end side of at least one of the side plate portions,
   the movable part including a head portion and a main body unit, the main body unit having an engaging part on a bottom end side that engages with the aperture, the main body unit being electrically connected to the at least one side plate portion, and the head portion configured to be electrically connected to a mating electronic component, and
   the impelling part impelling the movable part,
   wherein the retention and engaging part of the retention part and the engaging part of the movable part contact in the state of being impelled by the impelling part, and
   wherein the main body unit includes a pair of legs connected by the head portion, the impelling part is disposed between the pair of legs, and the impelling part impels the movable part by contacting the head portion.

2. The connector terminal assembly according to claim 1, wherein
   the head portion has a shape that is curved with respect to the mating electronic component, and
   the legs have a shape that is curved with respect to the side plate portions.

3. The connector terminal assembly according to claim 2, wherein
   the side plate portions have a shape that is curved towards the outside, and
   in the side plate portions, a distance between the pair of edges on the opposite side to the rear plate portion is smaller than a distance between the pair of legs.

4. The connector terminal assembly according to claim 1, wherein the ends of the legs are curved in a direction normal to the impelling direction such that a width of the side openings of the movable part is smaller than an external diameter of the impelling part.

5. A connector comprising a connector terminal assembly according to claim 1.

6. The connector terminal assembly according to claim 1, wherein the impelling part is a spring.

7. The connector terminal assembly according to claim 6, wherein the spring is a coil spring.

8. A connector terminal assembly, comprising:
   a retention part having a first and second side plate portions and a rear plate portion which connects the first and second side plate portions, each side plate portion having a bottom edge, each bottom edge defining a notch;
   a movable part having a head portion and first and second legs extending downwardly therefrom, each leg having a flange which extends outwardly therefrom, the head portion configured to be electrically connected to a mating electronic component; and
   an impelling part which is configured to impel the movable part in a manner to cause each flange to be positioned within a respective one of the notches such that the movable part electrically connects to the retention part.

9. The connector terminal assembly according to claim 8, wherein the impelling part is generally surrounded by the first and second side plate portions and the rear plate portion.

10. The connector terminal assembly according to claim 8, wherein the movable part is positioned between the impelling part and the retention part.

11. The connector terminal assembly according to claim 8, wherein the impelling part is a spring.

12. The connector terminal assembly according to claim 11, wherein the spring is a coil spring.

* * * * *